US006142460A

United States Patent [19]

Irwin

[11] Patent Number: 6,142,460

[45] Date of Patent: Nov. 7, 2000

[54] METHOD AND APPARATUS FOR INSTALLING AND REMOVING A SINK MOUNTED GARBAGE DISPOSER

[76] Inventor: Lawrence F. Irwin, 12860 San Fernando Rd., Sylmar, Calif. 91342

[21] Appl. No.: 09/099,012

[22] Filed: Jun. 17, 1998

[51] Int. Cl.$^{7}$ ........ B23Q 3/18

[52] U.S. Cl. ........ 269/60; 269/71; 269/37

[58] Field of Search ........ 269/60, 76, 111, 269/118, 121, 41, 37, 71, 901; 248/188.5, 188.2, 333, 653

[56] References Cited

U.S. PATENT DOCUMENTS

| | | | |
|---|---|---|---|
| 456,891 | 7/1891 | Fish | 269/37 |
| 1,311,918 | 8/1919 | Seager et al. | 248/188.5 |
| 2,803,872 | 8/1957 | Massa | 269/71 |
| 2,988,354 | 6/1961 | Schultz | 269/60 |
| 4,111,408 | 9/1978 | Love . | |
| 4,145,006 | 3/1979 | Webb . | |
| 4,209,166 | 6/1980 | DeRouen | 269/71 |
| 5,280,891 | 1/1994 | Estes . | |
| 5,522,300 | 6/1996 | Cheatwood | 248/188.5 |
| 5,662,315 | 9/1997 | Neiss et al. . | |
| 5,697,411 | 12/1997 | Vandaele . | |

*Primary Examiner*—David A. Scherbel
*Assistant Examiner*—Lee Wilson
*Attorney, Agent, or Firm*—James E. Brunton

[57] ABSTRACT

A method and apparatus for installing and removing sink mounted garbage disposers in a manner which safeguards against injury of the installer. The apparatus of the invention is compact, lightweight and easy to position within the confines of a kitchen cabinet at a location directly beneath the sink mounting assembly to which the garbage disposer is interconnected. The apparatus has both fine and course elevation adjustment capabilities thereby making it easy to use in both the installation and removal of sink mounted garbage disposers of wide variety of sizes and shapes.

12 Claims, 3 Drawing Sheets

METHOD AND APPARATUS FOR INSTALLING AND REMOVING A SINK MOUNTED GARBAGE DISPOSER

BACKGROUND OF THE INVENTION

1. Field of the Invention

The present invention relates generally to adjustable article support devices. More particularly, the invention concerns an adjustable device for use in installing and removing a sink mounted garbage disposer. The invention also concerns the method of using the apparatus for installing and removing a sink mounted garbage disposer.

2. Discussion of the Prior Art

In recent years it has become common practice in new construction to install with each new kitchen sink an electrically operated garbage disposer. Similarly, it has become routine to install electrically operated garbage disposers in existing kitchens. Typically, the modern garbage disposer is rotatably connected to a sink mounting assembly which is, in turn, connected to a sink sleeve that extends downwardly from the bottom of the kitchen sink. Usually, the kitchen sink is mounted in the top of the kitchen cabinet and only limited access to the disposer is possible via the front doors of the kitchen cabinet.

Because of the location of the garbage disposer, its installation and removal is both awkward and physically difficult. To gain access to the disposer the installer must usually lay on his or her back and extend the upper body portion into the interior of the sink cabinet below the disposer unit. In this rather awkward position the garbage disposer must be rotated relative to the sink mounting assembly so that it can either be connected to or disconnected from the sink mounted assembly.

Extreme care must be taken in the disposer disconnection operation because once the mounting ring of the garbage disposer is disconnected from the sink mounting assembly, the relatively heavy unit has a tendency to fall downwardly. To prevent the garbage disposer from falling, the installer must attempt to support the unit with one hand while at the same time attempting with the other hand to forcibly rotate the disposer relative to the sink mounting assembly. In removing old garbage disposers this operation can be difficult because the mounting ring may have become corroded and therefore, extremely difficult to rotate relative to the sink mounting assembly. Often during the step of forcibly rotating the garbage disposer to free it from the sink mounting assembly the heavy garbage disposer unit will fall and severely injure the installer whose hands and arms may be at least partially positioned beneath the garbage disposer.

Installing the garbage disposer is equally difficult since the installer must usually position his or her head and shoulders inside the kitchen cabinet, hold the heavy disposer with one hand so as to raise it into a position where it can rotatably connected to the sink mounting assembly, and then rotate the unit relative to the sink mounting assembly to sealably interconnect the disposer thereto.

Because of the confined space within which the installer must operate in installing and removing the garbage disposer, little room is left for mechanisms that can aid the workman in the installation task. Recognizing this problem, the present inventor has devised a small, relatively light weight and extremely easy to use support apparatus which can conveniently positioned within the confined space of the kitchen cabinet at a location beneath the garbage disposal. Once in position, a disposer support platform of the apparatus can be adjustably moved into a position wherein the garbage disposer is supported by, and securely interconnected with the support platform.

During the installation process, the apparatus of the invention can first be positioned beneath the sink mounting assembly and the new disposal unit securely connected to the adjustable support platform. Then by manipulating a pair of telescopically interconnected, tube like members, the disposer can be raised into close proximity with the sink mounting assembly. Final positioning of the disposer relative to the mounting ring is accomplished by rotating the disposer, which causes the support platform to also rotate along with a threaded rod which is threadably interconnected with the upper-most tube-like member of the apparatus. This fine adjustment capability enables the installer to position the disposer in precise alignment with the sink mounting assembly and then to finally rotate the disposer in a manner to cause engagement of the mounting ring of the disposer with the sink mounting assembly.

Use of the novel apparatus of the present invention not only safeguards against injury of the installer, but also prevents damage to the replacement garbage disposer unit during the installation step. When installation is completed it is a simple manner to disconnect the support platform from the garbage disposer and then to rotate the support platform relative to the upper, tube-like member so that the support platform can be lowered relative to the disposer to enable convenient removal of the apparatus from inside the kitchen cabinet.

SUMMARY OF THE INVENTION

It is an object of the present invention to provide a novel method and apparatus for installing and removing sink mounted garbage disposers in a manner which safeguards against injury of the installer.

Another object of the invention is to provide an apparatus of the aforementioned character which is compact, light weight and easy to position within the confines of a kitchen cabinet at a location directly beneath the sink mounting assembly to which the garbage disposer is interconnected.

Another object of the invention is to provide an apparatus of the type described in which the telescoping support members of the device are uniquely configured so that they can be lowered to accommodate large disposers, but can also be raised to accommodate much smaller disposers.

Another object of the invention is to provide an apparatus as described in the preceding paragraph which has both fine and course adjustment capabilities thereby making it easy to use in the installation and removal of garbage disposers of wide variety of sizes and shapes.

Another object of the invention is to provide an apparatus for installing and removing sink mounted garbage disposers which is of a simple construction embodying a minimum number of moving parts and one which can be used by relatively unskilled installers with a minimum of training.

Another object of the invention is to provide an apparatus of the character described in the preceding paragraphs which is durable, reliable in use and yet economical to manufacture in quantity.

DESCRIPTION OF THE INVENTION

Figure 1:
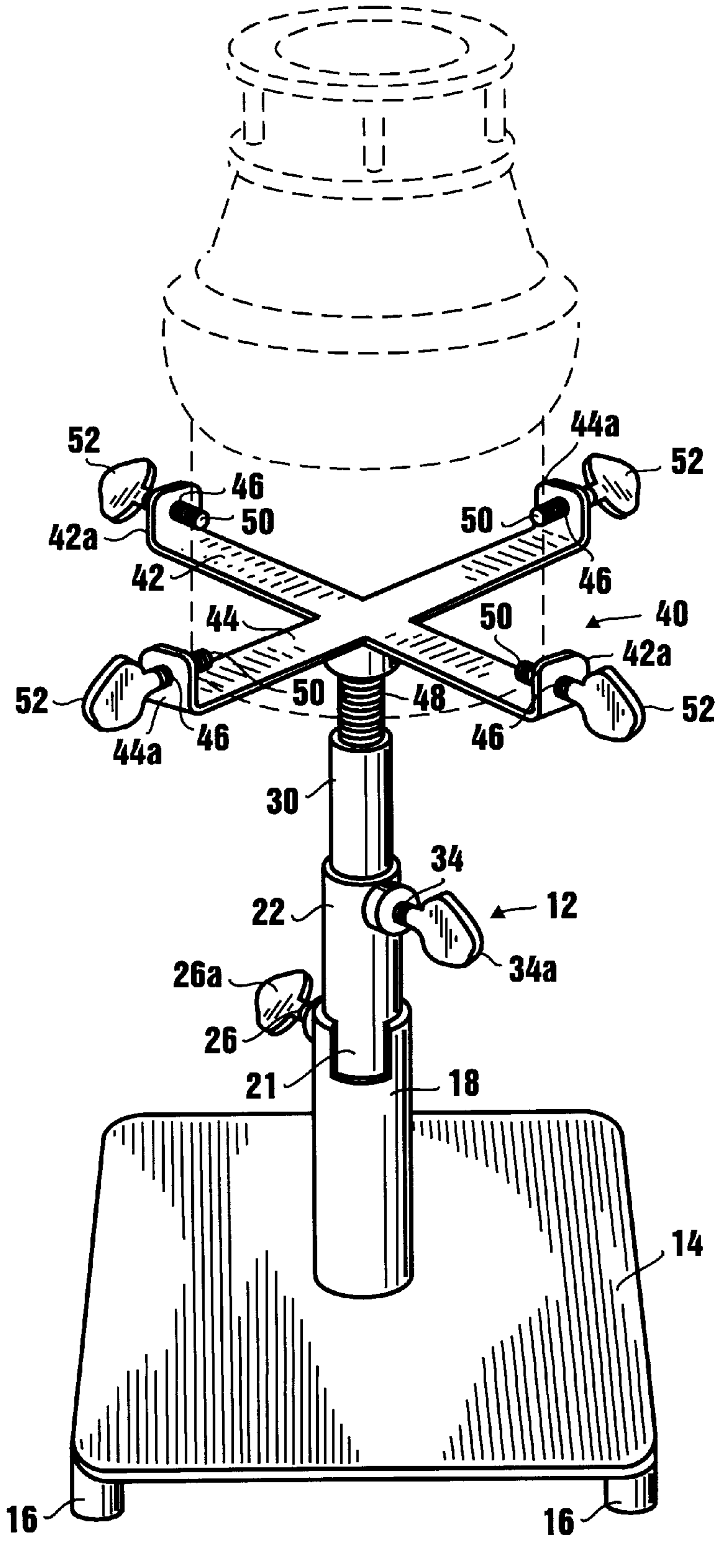
FIG. 1 is a generally perspective view of one form of the apparatus of the invention showing in phantom lines the manner in which a garbage disposal unit is interconnected with and supported by the support platform of the invention.
Figure 2:
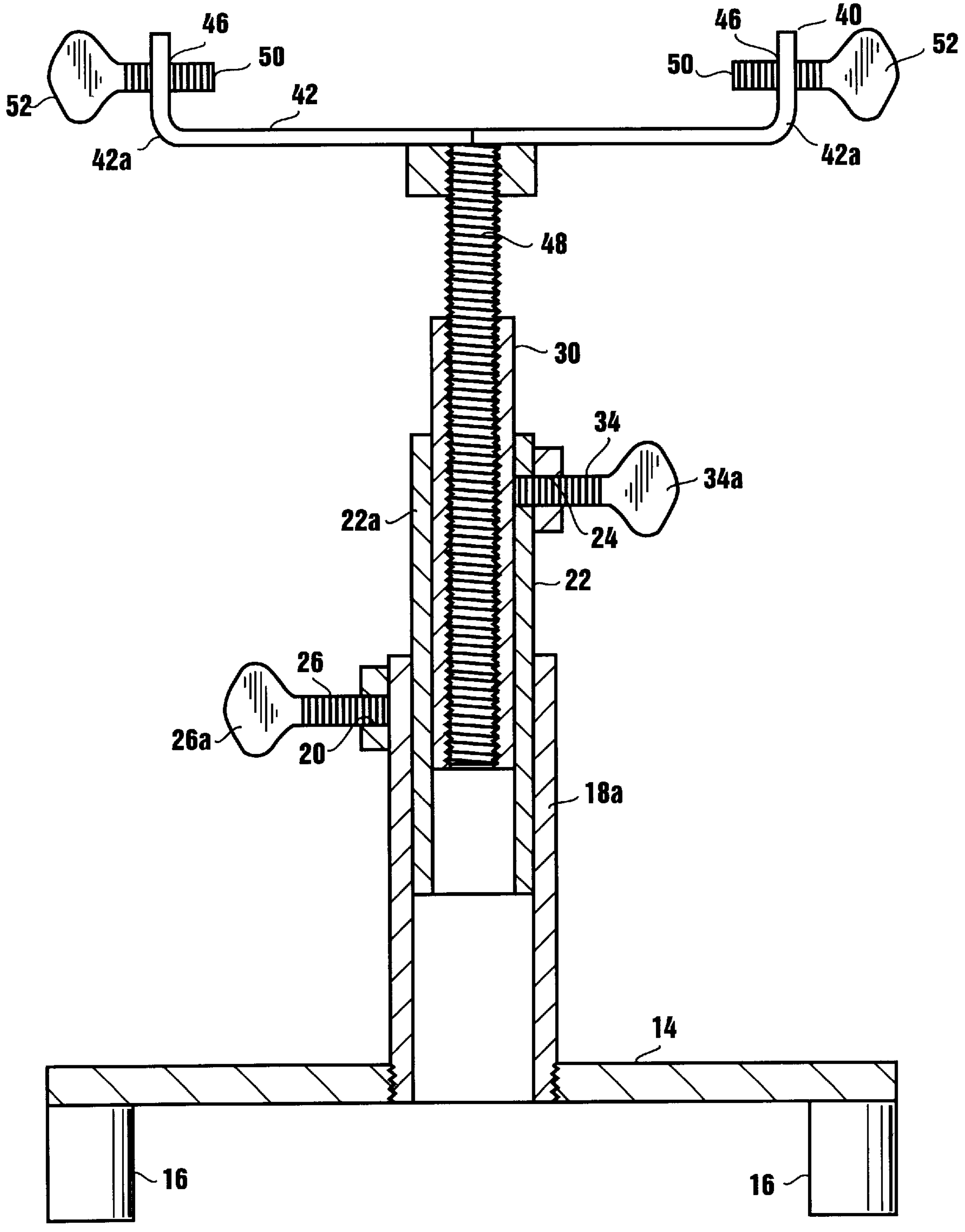
FIG. 2 is a front elevational, cross-sectional view of the apparatus of the invention shown in FIG. 1.

Referring to the drawings and in particularly to FIGS. 1 and 2, one form of the apparatus of the present invention for installing and removing a sink mounted garbage disposer is there illustrated and generally designated by the numeral 12. As best seen by referring to FIG. 1, the apparatus here comprises a generally rectangular shaped base 14 having a plurality of floor engaging feet 16. A first tube 18 having a first inside diameter is mounted on said base and extends generally perpendicularly upwardly therefrom. Tube 18 has an exterior wall 18*a* which is provided with a transverse threaded bore 20 which extends therethrough (FIG. 2) and a slot 21, the purpose of which will presently be described. A second tube 22 is telescopically receivable within first tube 20 for movement upwardly and downwardly with respect thereto. Second tube 22 also has an exterior wall 22*a* which is provided with a transverse threaded member 34 which extends therethrough. A first means is provided for locking the second tube in an elevated position with respect to the first tube. This first means here comprises a threaded bolt 26 which is threadably receivable within the threaded bore 20 provided in wall 18*a* of first tube 18. Member 26 terminates in a wing-like, finger-engaging member 26*a*.

A third tube 30 is telescopically receivable within the second tube for vertical telescopic movement relative thereto. A second means is provided for locking third tube 30 in an elevated position relative to second tube 22. This second means here comprises a threaded member 34 which is threadably receivable within threaded bore 24 provided in wall 22*a* of second tube 22. Member 34 terminates in a wing-like, finger-engaging extremity 34*a*. Importantly, when the second tube is telescopically lowered into first tube 18, this second locking means will be receivable within slot 21 to enable a starting configuration which will accommodate the largest of the commercially available sink-mounted disposers.

A disposer support assembly 36 is rotatably connected to third tube 30 and, in the present form of the invention, comprises a disposer support platform assembly 40 for supporting the lower surface of the garbage disposer. In the present form of the invention the disposer support platform comprises a pair of crossing straps 42 and 44 (FIG. 1), each having up-turned end portions 42*a* and 44*a* respectively which portions are provided with internally threaded apertures 46.

The means for interconnecting disposer support assembly 40 with third tube 30 here comprises a downwardly extending, externally threaded rod 48 which is threadably receivable within the internally threaded third tube 30. The disposer support assembly further includes connector means for removably connecting the garbage disposer to the disposer support platform. These connector means here comprise a plurality of threaded members 50 which are receivable within threaded apertures 46 provided in the up-turned end portions 42*a* and 44*a* of the crossing straps 42 and 44. Each of the members 50 includes a finger-engaging, wing-like extremity 52 for gripping by the user of the apparatus.

Figure 3:
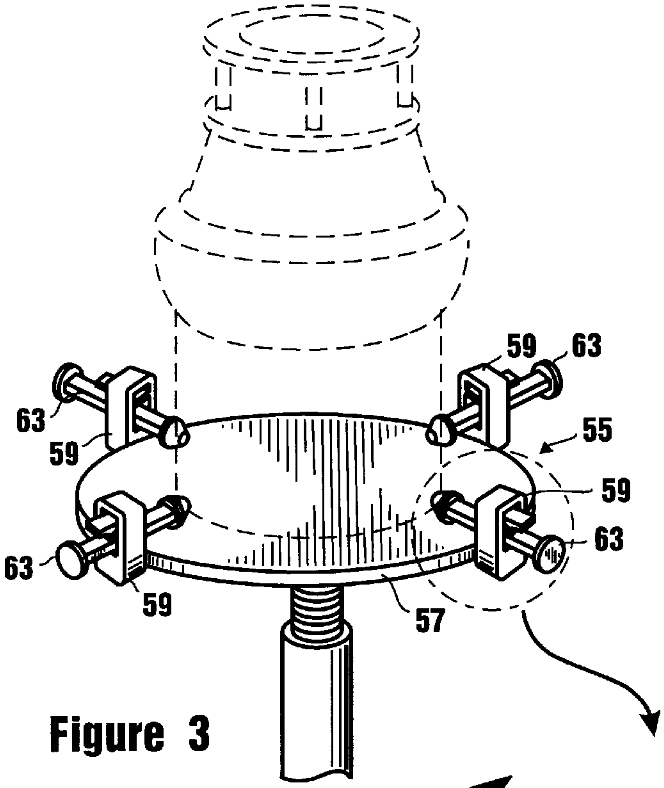
FIG. 3 is a generally perspective view of an alternate form of the support platform of the apparatus of the invention.
Figure 4:
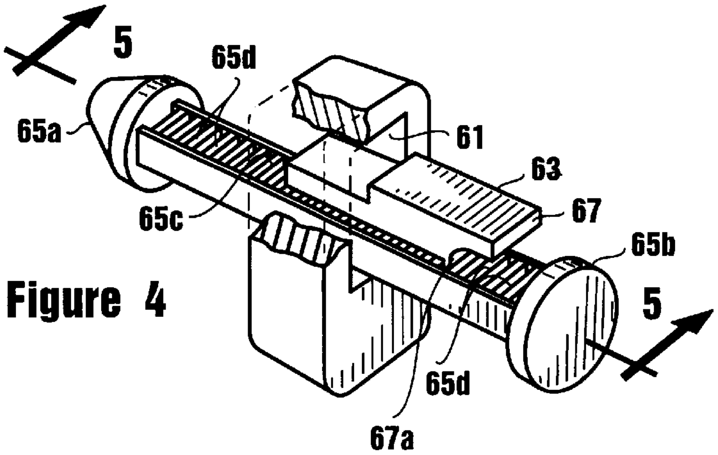
FIG. 4 is a fragmentary view showing the details of construction of the connector means of this latest embodiment for interconnecting the garbage disposer with the support platform.
Figure 5:
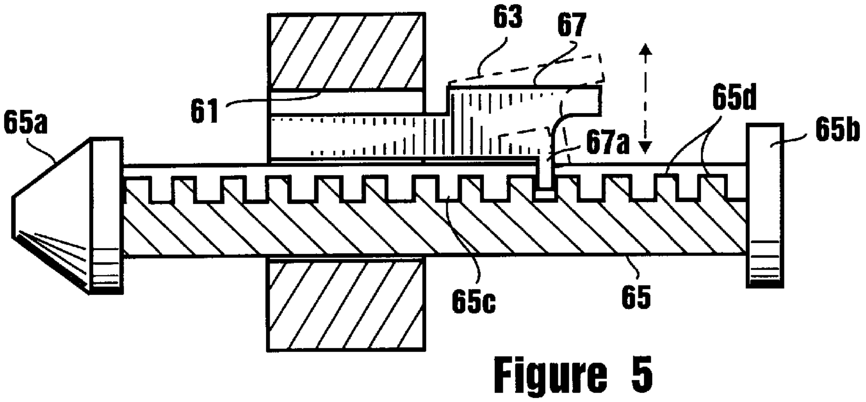
FIG. 5 is an enlarged, cross-sectional view taken along lines 5—5 of FIG. 4.

Referring next to FIGS. 3, 4, and 5, an alternate form of the support platform assembly portion of the apparatus of the invention is there illustrated and generally designated by the numeral 55. As best seen by referring to FIG. 3, this alternate form of the support platform assembly comprises a generally circular shaped, plate-like disposer support platform 57 for supporting the lower surface of the garbage disposer. Affixed to platform 57 at circumferentially spaced apart locations are four upstanding arms 59 each of which has a central opening 61 (FIGS. 3 and 4). Mounted within openings 61 are the connector means of this alternate form of the invention for releasably gripping the disposer. The connector means here comprise four novel quick advance and release connector mechanisms generally designated in the drawings by the numeral 63. As best seen in FIG. 5, each quick advance and release connector mechanism 63 comprises an elongated securement member 65 having first and second ends 65*a* and 65*b* and an intermediate rack-like central portion 65*c* made up of a plurality of longitudinally spaced apart teeth 65*d*. End 65*a* of the securement members are preferably formed from an elastomeric material, such as natural or synthetic rubber or the like, that will grip the sides of the disposer when the members are advanced into the securement position. operably associated with member 65 is a locking and release member 67 which includes a locking finger 67*a* that is closely receivable between a pair of selected adjacent teeth 65*d* when the locking and release member is in the downward, locking position shown in FIG. 5. As indicated by the phantom lines of FIG. 5, member 67 is pivotally movable from the downward, locking position shown in the solid lines to the upward, release position indicated by the phantom lines.

With the construction shown in the drawings, after the disposer has been positioned on support plate 57 in the manner indicated by the phantom lines in FIG. 3, end portions 65*a* of each of the elongated members 65 of the connector means can be quickly advanced into gripping engagement with the disposer by simply lifting the locking and release member and then forcibly pushing the securement members inwardly toward the disposer. Once elastomeric ends 65*a* of the securement members are in secure pressural engagement with the disposer, the locking member 67 is urged downwardly into locking engagement with two of the adjacent teeth provided on member 65.

In accordance with one form of the method of the invention for removing an installed disposer, the apparatus 12 is positioned on the floor of the sink cabinet directly below the installed disposer. To accommodate the larger disposers, tube 22 is telescopically lowered into tube 18 to a position wherein threaded member 34 settles into slot 21 (FIG. 1). Similarly, tube 30 is telescopically lowered into tube 22, thereby creating the lowest necessary starting configuration. This done, threaded member 26 is turned counter-clockwise by gripping wing-like, finger-engaging portion 28 so as to release tubular member 22 and permit it to be moved telescopically upwardly as necessary relative to member 18. After member 22 is raised, threaded member 26 is turned clockwise to tighten the threaded member against second tubular member 22 so as to hold it in the upraised position. Next, threaded member 34 is turned in a counterclockwise direction by gripping finger-like extremity 34*a* so that tubular member 30 can be telescopically raised as necessary relative to member 22 so as to position platform 40 in close proximity with the bottom of the disposer unit. This done, threaded member 34 is turned in a clockwise direction to engage tubular member 30 and maintain it in its telescopically upraised position. Final adjustment of the disposer support platform is a accomplished by rotating the platform relative to tubular member 30 in a direction to cause the threaded members 48 to raise the support platform into engagement with the base of the disposer unit. With the platform in this upraised position, the connector means are operated to connect the garbage disposer to the disposer support platform. More particularly, this step is accomplished by alternating tightening threaded members 46 so that the extremities of the members move into gripping engagement with the sides of the base portion of the disposer unit. When all four threaded members 50 are snugged down against the disposer, the disposer unit is safely supported on the support platform and can be rotated with the support platform.

With the disposer unit securely supported on the support platform and interconnected therewith by threaded members 50, the disposer unit can be safely disconnected from the sink mounted connector ring assembly by rotating the disposer in a loosening direction. Rotation of the disposer in a loosening direction will, of course, also rotate the support platform causing it to lower relative to base 14 so that the disposer unit can be cleared relative to the sink mounted connector ring assembly. Once the disposer unit has cleared the sink mounted ring assembly, the disposer, along with the apparatus of the invention, can be conveniently and safely removed from beneath the sink and into a space where the disposer unit can be safely disconnected from the platform assembly of the apparatus.

The method for installing a new garbage disposer is generally the reverse of the method described in the preceding paragraphs. More particularly, after the kitchen sink is in place and the downwardly extending sink mounted connector ring has been interconnected with the sink, the disposer unit to be installed is positioned on the support platform of the apparatus and secured thereto using the connector means or threaded members 50. The entire assemblage thus formed is inserted into the kitchen cabinet and the disposer unit is positioned directly below the sink connector ring. With the apparatus in this position, if the upper end of the disposer unit is not in reasonably close proximity with the sink mounted connector ring, tubular member 22 can be telescopically adjusted relative to tubular member 18, and tubular member 30 can be adjusted relative to tubular member 22 in the manner previously described. As previously mentioned, when a very large disposer is being installed, threaded connector 34 will be nested into slot 21 and tube 30 will be lowered to its lowest position within tube 22. When the disposer unit is in reasonably close proximity with the mounting ring, the disposer, along with the support platform, can be rotated in a direction to raise the disposer unit toward the downwardly extending sink mounted connector ring. Just prior to the connecting mechanism on the disposer unit moving into engagement with the connector ring, final centering of the apparatus is accomplished so that the disposer will smoothly and easily mate with the sink mounted connector ring. A continued rotational movement of platform assembly 40 and the disposer unit will then cause the disposer unit to move into mating engagement with the connector ring thereby sealably securing the disposer unit to the connector ring assembly. Once this connection has been made, connector members 50 can be loosened and moved away from the sides of the disposer unit. The support platform can then be rotated in a direction to lower it relative to base 14 so as to clear the disposer unit which is now hanging from the sink mounted connector ring assembly. Once the support platform is clear of the disposer unit, the apparatus 12 can be removed from the sink cabinet and can be conveniently transported to the next job site.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made with out departing from the scope and spirit of the invention, as set forth in the following claims.

I claim:

1. An apparatus for installing and removing a sink mounted garbage disposer comprising:

(a) a base;

(b) a first tube mounted on said base, and extending upwardly therefrom;

(c) a second tube telescopically movable with respect to said first tube;

(d) a first means for locking said second tube in a fixed position relative to said first tube;

(e) a third tube telescopically movable with respect to said second tube, said second tube being threaded;

(f) second means for locking said third tube in a fixed position relative to said second tube; and (g) a disposer support assembly rotatably connected to said third tube, said support assembly comprising;

(i) a disposer support platform;

(ii) connector means provided on said disposer support platform for connecting the garbage disposer to said disposer support platform; and (iii) a threaded rod connected to said disposer support platform and threadably connected to said threads of said third tube.

2. An apparatus as defined in claim 1 in which said disposer support platform comprises:

(a) a first rigid support strap having a first and second up-turned end portions; and (b) a second rigid support strap having first and second up-turned end portions, said second support strap being connected to a said first support strap and extending generally perpendicular thereto.

3. An apparatus for installing and removing a sink mounted garbage disposer comprising:

(a) a base;

(b) a first elongated tube connected to said base and extending generally perpendicularly upwardly therefrom, said first elongated tube having a slot formed therein, (c) a second elongated tube telescopically received within said first tube;

(d) first means for locking said second tube in an elevated position relative to said first tube;

(e) an internally threaded third tube telescopically received within the said second tube;

(f) second means for locking said third tube in an elevated position relative to said second tube, said second means being receivable in said slot formed in said first elongated tube; and (g) a disposer support assembly rotatably connected to said third tube, said support assembly comprising:

(i) a disposer support platform; and (ii) means for connecting said disposer support platform to said third tube; said means comprising a downwardly extending, externally threaded rod connected to said disposer support platform and threadably receivable within said internally threaded third tube.

4. An apparatus as defined in claim 3 in which said first and second tubes have threaded apertures and in which said first and second means comprise threaded members threadably receivable within said threaded apertures of said first and second tubes.

5. An apparatus as defined in claim 4 further including connector means for releasably connecting the garbage disposer to said disposer support platform.

6. An apparatus as defined in claim 5 in which said connector means comprise a plurality of threaded members threadably connected to said disposer support platform for movement toward and away from the garbage disposer.

7. An apparatus as defined in claim 5 in which said connector means comprise a plurality of circumferentially spaced apart quick advance and release mechanisms connected to said disposer platform.

8. An apparatus as defined in claim 7 in which each said advance and release mechanism comprises:

(a) an elongated member having first and second end portions and an intermediate portion having a plurality of spaced apart locking teeth, said first end being of an elastomeric material; and (b) a locking member operably associated with said elongated member and movable into locking engagement therewith.

9. An apparatus for installing and removing a sink mounted garbage disposer comprising:

(a) a generally rectangular shaped base having floor engaging feet;

(b) a first tube having a first inside diameter mounted on said base and extending generally perpendicularly upward therefrom, said first tube having a wall having a slot and threaded bore extending through said wall;

(c) a second tube having a second inside diameter telescopically received within said first tube, said second tube having a wall and a threadable bore extending through said wall, said second tube having an outside diameter less than said first diameter;

(d) a first threaded member threadably receivable within said threaded bore in said wall of said first tube for locking said second tube in a fixed position relative to said first tube;

(e) an internally threaded third tube having an outside diameter less than said second diameter, said third tube being telescopically received within the said second tube;

(f) a second threaded member threadably receivable within said threaded bore in said wall of said second tube for locking said third tube in a fixed position relative to said second tube, said second threaded member being receivable in said slot of said first tube; and (g) a disposer support assembly rotatably connected to said third tube, said support assembly comprising;

(i) a disposer support platform comprising first and second crossing straps each having an up-turned end portion provided with a threaded bore;

(ii) connector means for releasably connecting said disposer support platform to the garbage disposer, said connector means comprising threaded members receivable within said threaded bores provided in said up-turned end portions of said crossing straps; and (iii) an externally threaded rod extending downwardly from said disposal support platform and threadably connected to said internal threads of said third tube.

10. An apparatus as defined in claim 9 in which each of said threaded members of said connector means includes a finger engaging extremity.

11. An apparatus for installing and removing a sink mounted garbage disposer comprising:

(a) a base;

(b) a first tube mounted on said base, and extending upwardly therefrom;

(c) a second tube telescopically received within said first tube;

(b) a first tube mounted on said base, and extending upwardly therefrom;

(c) a second tube telescopically received within said first tube;

(d) a first means for locking said second tube in a fixed position relative to said first tube;

(e) a third tube telescopically received within the said second tube, (f) second means for locking said third tube in a fixed position relative to said second tube; and (g) a disposer support assembly rotatably connected to said third tube, said support assembly comprising;

(i) a disposer support platform comprising:

a. a first rigid support strap having a first and second up-turned end portions; and b. a second rigid support strap having first and second up-turned end portions, said second support strap being connected to said first support strap and extending generally perpendicular thereto;

(ii) connector means provided on said disposer support platform for connecting the garbage disposer to said disposer support platform, said connector means comprising a threaded member;

(d) a first means for locking said second tube in a fixed position relative to said first tube;

(e) an internally threaded third tube telescopically received within the said second tube;

(f) second means for locking said third tube in a fixed position relative to said second tube; and (g) a disposer support assembly rotatably connected to said third tube, said support assembly comprising;

(i) a disposer support platform;

(ii) connector means provided on said disposer support platform for connecting the garbage disposer to said disposer support platform; and (iii) an externally threaded rod connected to said disposer support platform and threadably connected to said internal threads of said third tube.

12. An apparatus for installing and removing a sink mounted garbage disposer comprising;

(a) a base;

(b) a first tube mounted on said base, and extending upwardly therefrom;

(c) a second tube telescopically received within said first tube;

(d) a first means for locking said second tube in a fixed position relative to said first tube;

(e) a third tube telescopically received within the said second tube;

(f) second means for locking said third tube in a fixed position relative to said second tube; and (g) a disposer support assembly rotatably connected to said third tube, said support assembly comprising:

(i) a disposer support platform comprising:

a. a first rigid support strap having first and second up-turned end portions; and b. a second rigid support strap having first and second up-turned end portions, said second support strap being connected to said first support strap and extending generally perpendicular thereto;

(ii) connector means provided on said disposer support platform for connecting the garbage disposer to said disposer support platform, said connector means comprising a threaded member threadably connected to each of said up-turned end portions of each of said first and second support straps for movement toward and away from the garbage disposer.

* * * * *